Figure 1:
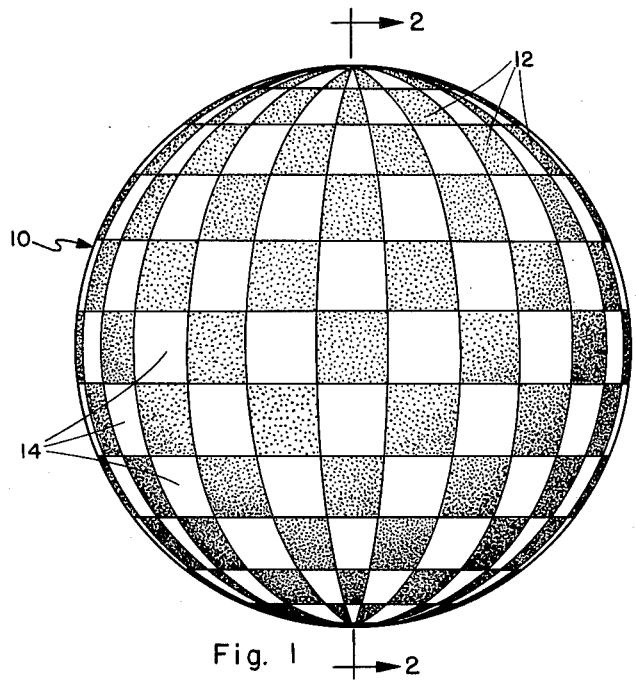

Sept. 14, 1965        M. G. CHATELAIN        3,206,749
SPHERICAL CHECKERBOARD REFLECTOR
Filed March 20, 1961                2 Sheets-Sheet 1

INVENTOR.
MAURICE G. CHATELAIN
BY
Knox & Knox

Sept. 14, 1965   M. G. CHATELAIN   3,206,749
SPHERICAL CHECKERBOARD REFLECTOR
Filed March 20, 1961   2 Sheets-Sheet 2

INVENTOR.
MAURICE G. CHATELAIN
BY
Knox & Knox

United States Patent Office 3,206,749
Patented Sept. 14, 1965

3,206,749
SPHERICAL CHECKERBOARD REFLECTOR
Maurice G. Chatelain, San Diego, Calif., assignor to The Ryan Aeronautical Co., San Diego, Calif.
Filed Mar. 20, 1961, Ser. No. 97,065
2 Claims. (Cl. 343—18)

The present invention relates to a satellite, and more particularly to a spherical satellite having a checkerboard-type surface that acts as an antenna that receives and redirects radiations.

Background

The recent launching and orbiting of a balloon-type satellite, under the title "Operation Echo," has focused attention on a new world-wide type of communication system. In this system, radiations from one part of the earth, say the United States, are directed at the satellite. Since the satellite is at spherical balloon having a metallized outer surface, some portion of the balloon's surface will be at the precise angle necessary to reflect the radiation to some other part of the earth, say England. Another portion of the balloon's surface will be at the precise angle necessary to reflect the radiation to say, Asia, and so on. In this mode of operation, the satellite is called "passive," since it acts like a mirror and does not require any power to perform its function.

If these radiations contain information, such as telephone messages, radio programs, television pictures, coded data, etc., the information can be received at innumerable locations in the form of a reflection, or an "echo."

Obviously, only the surface of the balloon that is facing the earth can reflect the radiations. It has been computed that for a balloon satellite at a satisfactory height above the earth, about one-third of the balloon's surface may be useful for reflecting the radiations back to earth.

In its simplest form, the balloon is "unstabilized"; that is, it is free to rotate or to assume any orientation that may happen to be imparted to it by the act of getting into orbit. Since the balloon is unstabilized, it is impossible to predict which portion of the balloon's surface will face the earth. Therefore, to assure reliability, every portion of the balloon's surface is metallized to act as a reflector.

As may be realized, this expedient practically triples the weight of the satellite. If it were possible to reduce the weight of the reflective portion, the balloon could be more easily sent into orbit, or conversely stated, a larger more-efficient balloon could be orbited.

Objects

It is therefore the principal object of my invention to provide an improved satellite to be used for communication.

It is another object of my invention to provide a balloon-type structure that achieves a substantial reflective effect while weighing less than prior-art balloons.

It is still another object of my invention to provide a balloon-type satellite that provides improved radiation-reflection characteristics.

Drawings

Figure 2:
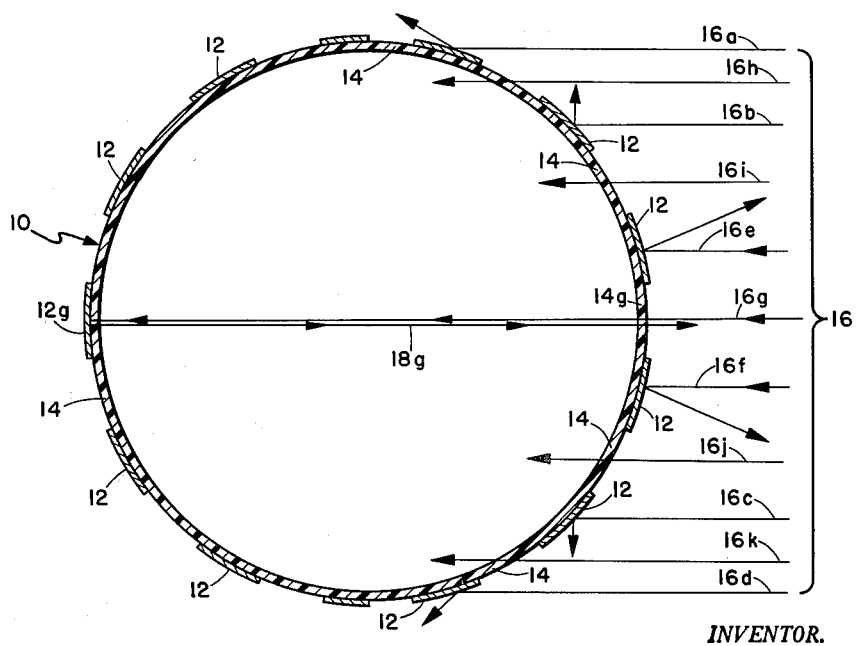
Figure 3:
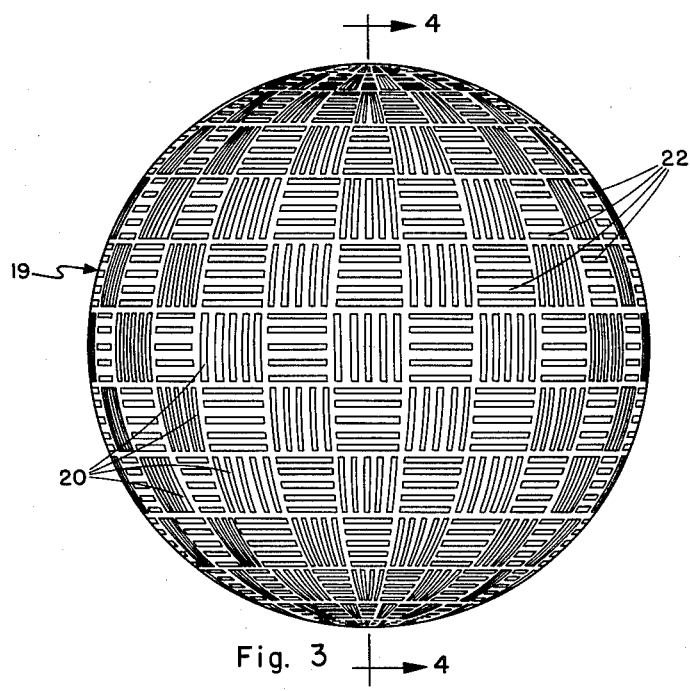
Figure 4:
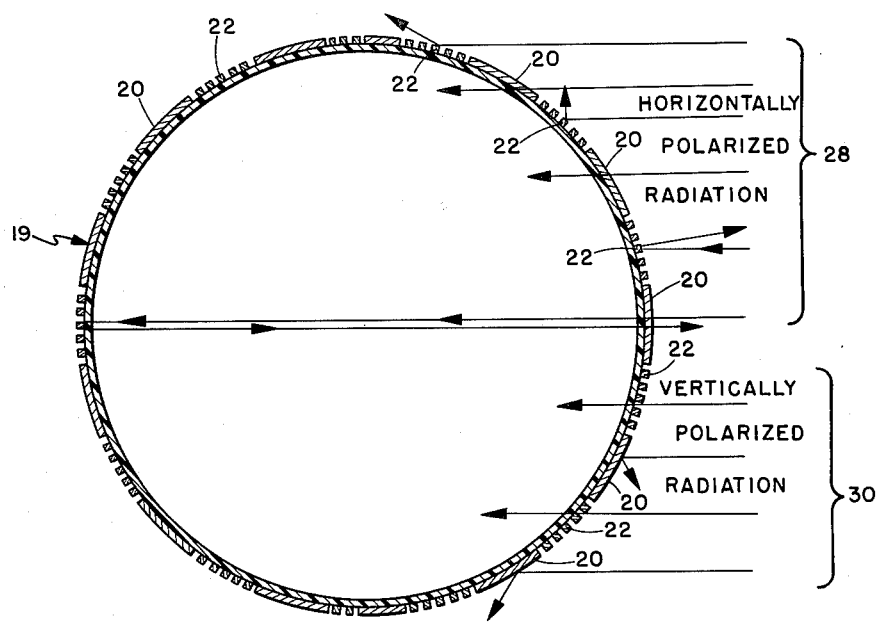

The attainment of this object, and others, will be realized from the following specification, taken in conjunction with the drawings, of which:

FIGURE 1 shows a satellite embodying my basic inventive concept;
FIGURE 2 is a cross sectional view showing the operating principle of the satellite of FIGURE 1;
FIGURE 3 shows another embodiment of my invention; and
FIGURE 4 is another cross sectional view showing the operating principle of the satellite of FIGURE 3.

Broadly speaking my invention contemplates a balloon-type satellite whose surface resembles a checkerboard. Alternate areas of the surface are treated to reflect radiation; and adjacent areas are radiation permeable.

When radiations strike the balloon, those that are reflected into outer space are known as the "forward scattered" reflections; while the others are the "backward scattered" reflections.

It is, of course, the backward scattered radiation finding its way back to the earth that is useful.

As will be realized, only a minute percentage of the outwardly transmitted radiation is reflected back to, and received at a receiving station on earth. This effect may be visualized as follows. Of all the radiation that strikes the balloon, only the ray striking that small portion of the balloon's surface that is at a specific angle, is reflected to a specific receiving station. All the other rays are reflected out into space or to other parts of the earth where there are no receivers. If the surface of the balloon is wrinkled, rays will be reflected from more surface areas; but each ray will be only partly reflected because of the scattering effect caused by the wrinkled surface.

When the reflected radiation reaches the receiving station, it must of course be amplified. It therefore follows that a stronger reflected signal is desirable. Moreover, the stronger reflected signal is easier to distinguish from so-called "noise" that tends to mask the signal.

Thus, any improvement, that permits a larger percentage of the impinging radiation to be reflected back to earth, is very worthwhile.

My invention will be understood from a study of FIGURE 1. This shows a balloon-type satellite 10 formed of a radiation-permeable material such as the plastic available under the trade name "Mylar." Present-day balloon satellites are made of this material, since it is strong, thin, flexible, easily inflated, etc. It so happens that this material is also permeable to radiation, which makes it suitable for my balloon-satellite. As shown in FIGURE 1, the surface of satellite 10 has a "checkerboard" appearance. This is caused by the fact that alternate areas 12 thereof are coated with a reflective material, while the other alternate areas 14 are not coated. As may be realized, this immediately reduces the weight of the metallized coating by half.

The result of the checkerboard patterned surface is as follows. The radiation striking the reflective areas 12 is reflected as in prior-art balloon satellites. The radiation striking the non-reflective, or radiation-transparent areas 14 enters the inner volume of the balloon with an effect that will be discussed later.

Referring now to FIGURE 2, it will be seen that balloon 10 comprises an inflatable sphere of material that readily transmits radiation therethrough. The radiation permeable areas are indicated by reference character 14. Positioned on alternate portions of the balloon's surface are radiation reflective areas 12, comprising a metallic material, or a material that reflects radiation. It will be noted that the exterior surfaces of reflective areas 12 are smooth; and that the interior surfaces of reflective areas 12, where they meet the material of the balloon, are also smooth. A reflective area 12 is positioned diametrically opposite each permeable area 14, and vice versa.

Operation

The satellite is used as follows: Incoming rays of radiation 16, which carry information such as messages, pictures, etc., approach the balloon. Some peripheral rays, such as 16a, 16b, 16c, and 16d, strike reflective portions 12, and are reflected into outer space in the form of forward scattered radiation. Central rays, such as 16e and 16f, which strike reflective portions 12 are reflected back to the earth in the form of backward scattered radiation; and each of these reflected rays is thereby directed to a different portion of the earth. These backward scattered radiations are, of course, similar to those produced by prior-art balloon satellites.

Axial ray 16g is shown traversing a radiation transparent area 14g to impinge upon the diametrically opposite reflective area 12g. As previously explained, the area 12g is smooth and reflective on both its inner and outer surfaces. Incoming ray 16g is therefore reflected from the inner surface of reflective area 12g, and is shown as reflected ray 18g.

Reflected ray 18g is shown ideally, that is, as though it were directed back exactly to the point where rays 16 originated. In actuality, reflective surface 12g is slightly concave, so that the bundle of rays represented by 18g would actually be focused, after which they would diverge. In this way rays 18g would cover an appreciable portion of the earth. Thus far, my improved balloon satellite achieves the same result as prior-art balloon satellites, but weighs about half as much.

FIGURE 2 also shows rays 16h, 16i, 16j, and 16k; these traversing the radiation-permeable areas 14. In the interest of clarity, their trajectories are not shown, but it is obvious that they will enter the interior of the balloon. Most of these rays will impinge on the inner surfaces of reflective areas 12 on the back of the satellite, and will be reflected in a multiplicity of directions. Mathematical analysis shows that a goodly proportion of the internal reflections will eventually cause rays to emerge from the sphere in a backward scattered direction toward the earth. They will emerge at a variety of angles, and will reinforce rays such as 18g.

It is of course obvious that the reflective and transparent areas will cover the entire surface of the satellite. Thus, regardless of how the satellite rotates, or its particular orientation, the backward scattered radiation will be substantially constant.

In this way, my invention achieves an improved result as compared with prior-art balloon satellites.

The "dual polarization" embodiment of my invention shown in FIGURES 3 and 4 operates on a similar principle to that explained in connection with FIGURES 1 and 2. In order to understand this embodiment, the following background will be helpful. Radiation may have a characteristic known as "polarization"; and the radiated energy may be "vertically polarized," "horizontally polarized," or polarized at any other desired angle. Horizontally polarized radiation will freely traverse a grid of vertical wires, but will be reflected by a grid of horizontal wires. Conversely, vertically polarized radiation will freely traverse a grid of horizontal wires, but will be reflected by a grid of vertical wires.

FIGURE 3 shows a balloon-satellite 19 formed of a material such as Mylar as previously explained.

The checkerboard pattern on its surface comprises alternate areas 20 where there is a grid of vertical metallic stripes; while adjacent areas 22 have grids of horizontally positioned metallic stripes. These areas are positioned as discussed in connection with FIGURES 1 and 2.

FIGURE 4 shows a cross sectional view of my dual polarization balloon-satellite 19, the areas 20 shown by the rectangles representing grids of vertical metallic wires, while areas 22 shown by the small squares represent grids of horizontally positioned wires.

In FIGURE 4, in coming horizontally polarized radiation 28 is shown to be reflected by areas 22 of horizontally positioned wires; this corresponding to the radiation reflection produced in FIGURE 2 by the reflective surfaces. FIGURE 4 also shows that incoming horizontally polarized radiation 28 traverses areas 20 having the vertically positioned wires. This effect is similar to that explained in connection with the radiation-permeable areas of FIGURES 1 and 2.

Incoming vertically polarized radiation is represented at 30. This vertically polarized radiation is reflected from areas 20 having grids of vertical wires, but traverses areas 22 having horizontally positioned wires.

In each case the rays that enter balloon 19 undergo multiple reflections, as previously explained, and an appreciable percentage of them are reflected back to the earth along with the backward scattered radiation.

Thus, each type of polarized radiation is backward scattered toward the earth in much the same manner as previously explained.

It will be seen that even though each area of balloon satellite 19 has metallized portions on the surface thereof, these metallized portions are in the form of thin stripes. Therefore the overall weight of the metallizing is even less than that of FIGURES 1 and 2. Not only does my dual polarization balloon satellite weight far less than prior-art devices, but it has the advantage of automatically isolating information on vertically and horizontally polarized radiations.

*Summary*

It may thus be seen that my balloon-satellite has many advantages over prior-art devices. It is a passive antenna, and therefore does not require any power. It is designed for non-stabilized operation, and is therefore extremely simple. It is much lighter in weight than present-day balloon satellites, and yet reflects much more energy. The dual polarization embodiment permits isolation by means of the polarization characteristic, while permitting radiations of the same frequency to be used.

It is understood that minor variation from the form of the invention disclosed herein may be made without departure from the spirit and scope of the invention, and that the specification and drawing are to be considered as merely illustrative rather than limiting.

I claim:
1. A satellite comprising:
an inflatable balloon having a checker-board patterned surface;
a pattern of vertical stripes of electromagnetic radiation reflective material forming alternate areas of said checkerboard pattern;
and a pattern of horizontal stripes of electromagnetic radiation reflective material forming other alternate areas of said checkerboard pattern.
2. A satellite comprising:
an inflatable balloon having a skin of electromagnetic radiation permeable material;
a checkerboard pattern on the skin of said balloon, said pattern comprising vertical stripes of electromagnetic radiation-reflective material on alternate areas of said checkerboard pattern said pattern further comprising horizontal strips of electromagnetic radiation-reflective material on other alternate areas of said checkerboard pattern.

References Cited by the Examiner

UNITED STATES PATENTS

| | | | |
|---|---|---|---|
| 2,455,469 | 12/48 | Caspar | 343—18 |
| 2,580,921 | 1/52 | Iams | 343—18 |
| 2,921,305 | 1/60 | Cole et al. | 343—18 |
| 3,167,769 | 1/65 | Boyer | 343—18 |

CHESTER L. JUSTUS, *Primary Examiner.*

KATHLEEN CLAFFY, *Examiner.*